United States Patent [19]

Thoese et al.

[11] 4,139,506

[45] Feb. 13, 1979

[54] COMPOSITION SUITABLE FOR USE AS AN ADHESIVE LAYER ON A SHAPED STRUCTURE OF A POLYESTER

[75] Inventors: Klaus Thoese, Naurod; Karl-Heinz Jung, Wiesbaden, both of Fed. Rep. of Germany

[73] Assignee: Hoechst Aktiengesellschaft, Fed. Rep. of Germany

[21] Appl. No.: 748,765

[22] Filed: Dec. 8, 1976

[30] Foreign Application Priority Data

Dec. 11, 1975 [DE] Fed. Rep. of Germany ....... 2555783

[51] Int. Cl.$^2$ ........................... C08L 1/10; C08L 1/14
[52] U.S. Cl. ................................... 260/16; 96/87 R; 96/91 R; 101/456; 101/457; 260/15; 260/873; 428/480; 428/483; 428/908; 428/909; 428/910
[58] Field of Search ........................... 260/16, 15, 873; 428/480, 483

[56] References Cited

U.S. PATENT DOCUMENTS

| | | | |
|---|---|---|---|
| 2,929,737 | 3/1960 | Tischbein | 428/483 |
| 3,158,494 | 11/1964 | Eikvar | 428/480 |
| 3,574,154 | 4/1971 | Shaw et al. | 260/16 |
| 3,584,075 | 6/1971 | Bock et al. | 260/13 |
| 3,764,365 | 9/1973 | Duncan et al. | 428/480 |
| 3,770,478 | 11/1973 | Bishop | 428/480 |
| 4,029,847 | 6/1977 | Imagawa et al. | 428/480 |

FOREIGN PATENT DOCUMENTS

| | | |
|---|---|---|
| 1053362 | 3/1959 | Fed. Rep. of Germany. |
| 971996 | 4/1959 | Fed. Rep. of Germany. |
| 5036473 | 11/1975 | Japan ........................... 428/480 |
| 822894 | 11/1959 | United Kingdom. |
| 1394689 | 5/1975 | United Kingdom ...................... 428/480 |

OTHER PUBLICATIONS

Chem. Absts., 66: 19985j, Polyurethan Varnish; Iattoni et al.
Chem. Absts., 70: 98058t, Polyurethane Wire Coating, Assoc. Elec. Ind; Ltd.
Chem. Absts., 72:33368r, Modified Polyesters for Coatings, Hudak.
Chem. Absts., 72: 122,538p, Copolyester-Transfer-Compositions, Mills et al.
Chem. Absts., 73: 16452s, Polyester Coatings, Riemhofer.

*Primary Examiner*—Edward M. Woodberry
*Attorney, Agent, or Firm*—James E. Bryan

[57] ABSTRACT

This invention relates to a composition comprising a blend of a copolyester, a polyisocyanate and a compatible organic polymer, the ratio by weight of polyester to polymer being within the range of from about 20 : 1 to 0.5 : 1 by weight. The invention also relates to a laminate including the novel composition.

8 Claims, No Drawings

COMPOSITION SUITABLE FOR USE AS AN ADHESIVE LAYER ON A SHAPED STRUCTURE OF A POLYESTER

The present invention relates to an adhesive composition for the manufacture of layers having good adhesion to shaped parts of polyesters, especially polyethylene terephthalate, and to an adhesive layer. The invention furthermore relates to a duplicating material for use in diazo printing.

Shaped parts of linear polyesters, particularly polyethylene terephthalate, or copolyesters, especially in the form of fibers, threads or sheets, have acquired great importance. For example, polyester sheets are used as a base for photographic films, drawing sheets or in duplicating materials. They are distinguished, after orienting and setting, by good mechanical properties, high chemical resistance and dimensional stability, which, in addition to other properties, explains their economic significance.

In the manufacture of coated polyester films a problem arises in obtaining good adhesion between the support sheet and the layers to be applied while still being able to roll and unroll the coated materials without blocking.

In diazo printing, alkaline development, for example, is necessary in the production of images after exposure under an original with a suitable UV-lamp in order to produce the diazo dyestuff at the areas that have not been exposed. In this development the sheets are subjected to elevated temperatures in an alkaline medium also in the presence of water or water vapor. It is particularly important here for there to be a flawless, strong bond between the polyester sheet and the applied layer or layers.

The anchoring of polymeric materials, particularly hydrophilic products, on sheets, for example of polyethylene terephthalate, presents great difficulties. Should the layers in addition contain chemicals of the type present in photochemistry and diazo printing, and should they be subjected to exposure and developing processes in which the strength of adhesion of the layers is, according to experience, placed under great stress, the adhesive forces must be particularly strong in order to maintain the bond without any defects occurring.

There has therefore been no lack of attempts to develop products which bring about an improved adhesion to the polyester sheet.

For example, it has been proposed in German Pat. No. 971,996, to use high molecular weight polyesters as the layer providing adhesion. German Auslegeschrift No. 1,053,362, proposes the use of, for example, isocyanates or p-nitroaniline as layers providing adhesion. In British Pat. No. 822,894, it is proposed to use layers of polyisocyanates.

German Patent Application No. P 9899 IV/57b discloses a combination of polyesters or copolyesters with organic polyisocyanates or polyisothiocyanates for improving adhesion.

To anchor hydrophilic polymers the above-mentioned substances that bring about adhesion require at least one additional adhesive layer that produces an adequate bond between the covering layer and the anchoring layer.

Economically it would be extremely desirable to be able to employ only one anchoring layer, which hitherto has been impossible if there is a great difference in the natures of the support layer, and the covering layer, as is the case, for example, when cellulose esters which can be sensitized by diffusion from aqueous-alcoholic solution with light-sensitive components are to be applied to a polyethylene terephthalate base.

When using polyisocyanates as an adhesive layer element there is the drawback that either adhesive properties appear only after an induction period or the layers cannot be stored because they are sensitive to atmospheric humidity and may stick together. If the anchoring layers are heated to a higher temperature to counteract this disadvantage, they may lose their property of adhesion altogether or turn yellow.

Copolyesters are themselves thermoplastic substances; under heat stress, as is customary in developing processes for printing materials, they lose, in an undesirable manner, their adhesive power. Anchoring layers composed of blends of copolyester with compounds having isocyanate groups have not proved sufficiently satisfactory in practice, for example in reprography, as they resulted in substrates which either had too soft a surface, so that the sheets coated therewith could not be wound up without sticking together on a roll, or the adhesive power was not adequate for the high demands made by the industrial application if they were hardened by special thermal treatment or the copolyester components made harder by the selection of monomers suitable for this purpose. Soft-adjusted mixtures of mixed polyester with polyisocyanates are used as adhesives, for example, for laminating, where the softness of such layers does not have an adverse effect. In all processing techniques where it is necessary or desirable to wind up and store the web provided with a substrate, known adhesives having good adhesive properties cannot be used for the above reasons.

The present invention provides a composition, suitable for use as an adhesive layer on a shaped structure of a polyester, which comprises a blend of a copolyester, a polyisocyanate and an organic polymer compatible with the blend of the copolyester and the polyisocyanate, the ratio of copolyester to the polymer being in the range of 20:1 to 0.5:1, preferably 10:1 to 1:1 by weight.

The invention also provides a layer of such a polymer especially a layer supported on a polyester, e.g. polyethylene terephthalate, and a reprographic material including such a layer.

Advantageously, a cellulose ester is used as the additional polymer, cellulose acetate, cellulose propionates, cellulose acetobutyrate or mixtures thereof being preferred.

Other suitable additional polymers include a copolymer, especially particularly of vinylidene chloride. Copolyesters of vinylidene chloride with acrylic acid, or of methylvinyl ether and maleic acid anhydride, and/or of acrylic acid and methacrylic acid esters have proved particularly suitable.

Hexamethoxymethyl melamine also may be used successfully as the addition.

The additive polymers may be used alone or in admixture.

In the production of reprographic materials, known diazo printing materials can be added to the polymeric composition before the composition is applied to the supporting material. It is also possible, however, for them to be introduced into the adhesive layer by after-treatment with aqueous-alcoholic solutions of these substances.

Other methods of making reprographic materials include applying a suitable binder together with a diazo chemical to the adhesive layer of the invention, or, applying a binder layer and then treating it with an aqueous-alcoholic solution of diazo chemical.

There are used as polyester support materials especially those in sheet form, particularly in biaxially stretched form.

The polyesters used as support materials preferably are those of polybutylene terephthalate, a copolyester, for example produced from terephthalic acid, isophthalic acid and ethylene glycol or 1,4-dimethylglycol cyclohexane, in which the isophthalic acid proportion is up to 50 mole percent, or from terephthalic acid and ethylene glycol and polyethylene glycol having a molecular weight of 1,000 to 10,000 or from naphthalene-2,6-dicarboxylic acid, terephthalic acid and ethylene glycol.

Polyethylene terephthalate, however, has proved particularly suitable as a supporting material.

Apart from the compounds mentioned, the composition also may contain the usual additives, e.g., pigments, for example $TiO_2$, $Al_2O_3$ or $SiO_2$, antistatic agents and dyestuffs.

The composition is applied from organic solution onto the supporting materials, using conventional techniques. One or more additional layers can be applied to the adhesive layer, wherein the adhesion both with respect to the carrier material and with respect to the layer to be applied has been shown to have been improved according to the invention.

It also was surprisingly found that soft adjustments of mixed polyester and polyisocyanates with good adhesive power can be so modified by blending with the component of the invention that relatively hard surfaces are produced, as a result of which coated sheets in a roll no longer stick together. The adhesive layers are resistant to atmospheric humidity and heat stress. They are clear substrates with excellent adhesive strengths for a series of polymers.

In the same manner, hard-adjusted substrates of mixed polyester and polyisocyanates, which do not have sufficient adhesive powers, can be so modified by admixture with the component of the invention that the adhesive strength with respect to layers later applied is substantially improved and products which are usable in practice are produced.

The decrease of the adhesive strength, often observed when polyisocyanates are used, during storage of films on a substrate, does does not occur in the case of the adhesive layers of the invention. The adhesive layers of the invention can, if necessary, contain commercial slip agents of small particle size which do not impair the transparency of the films or reduce the adhesion of the substrate in any way.

The following examples further illustrate the invention:

EXAMPLE 1

A solution of the following composition is applied to a 100μ thick, glass-clear sheet of biaxially oriented polyethylene terephthalate:
  150 g of an 18% by weight solution of a commercially available copolycondensate of terephthalic acid with isophthalic acid and sebacic acid as acid components and ethylene glycol, diglycol and butanediol as alcohol components,
  5 g of a film-forming polyisocyanate, dissolved in ethyl acetate, as a cross-linking component,
  3 g of cellulose propionate having an acetyl content of 3.6%, a propionyl content of 44.8% and a hydroxyl content of 1.8%,
  332 g of acetone, and
  110 g of toluene.

The solution dries to a clear film of 0.5 g/m² thickness (sample I) and, even at high relative humidity, can be stored on a reel and unwound from the reel when required without blocking and sticking.

If the 0.5 g/m² thick layer does not contain the addition of cellulose propionate (sample II) then the sheet cannot be unwound from the reel without damage to the surface even if the thin substrate has been dried at temperatures of 140° C.

To test the adhesion of the substrate with and without the addition of cellulose propionate, a lacquer containing cellulose propionate as binder and with couplers, stabilizing additives and diazo compounds typically used in the production of a blue dyestuff, was applied in a 6μ thick layer and dried for three minutes at 110° C.

After exposure and treatment with water vapor and ammonia, to test the adhesion the layers were scored according to DIN 53,151 with a cross-hatch adhesion test apparatus type GS 30. Then adhesive tape (Tesaband (R) No. 104) was pressed onto the marked areas of the films and removed again with a jerk. The adhesion of both films was good but in the case of extreme stress before the adhesion test the adhesion to the substrate according to the invention is better.

EXAMPLE 2

The following solution was applied to the support sheet of Example 1:
  15 g of a copolyester of terephthalic acid, neopentyl glycol and ethylene glycol, having a mean molecular weight of 18,000 to 20,000,
  15 g of a copolymer of vinylidene chloride, vinyl chloride and acrylonitrile with a nitrogen content of 2.7 to 3.0%,
  4 g of a solution of the addition product of trimethylol propane with toluylene diisocyanate in ethyl acetate, dissolved so that the solution is of 75% weight concentration,
  433 g of methyl ethyl ketone, and
  113 g of toluene.

The solution was dried at an elevated temperature to a clear film of 0.5 g/m².

This adhesive layer was coated with 8μ thick films of cellulose propionate.

The covering layer contained, in a further example, 35% by weight of $Al_2O_3$ having a mean particle size of 6μ, and in a further example 20% by weight of synthetic silica having a mean particle size of 8μ.

According to the adhesion test described in the first example, the adhesion of all covering layers to the above-described substrate was good. On the other hand, the layers do not adhere to an adhesive layer where the addition of the mixed polymer of vinylidene chloride according to the invention has been omitted.

EXAMPLE 3

The solution of Example 2 was applied to a 50μ thick biaxially oriented sheet of polyethylene terephthalate (sample I). At the same time, another sample of the same sheet was prepared with a layer which did not contain the addition of the vinylidene chloride copolymer (sample II).

Both samples were coated, in a wet film thickness of 100μ, with an 8% by weight solution of cellulose acetate with an acetyl content of 38.4% by weight and a hydroxyl content of 4.7% by weight in a mixture of acetone with alcohols. To examine the adhesive strength, the adhesive tape test, as described in Example 1, was carried out.

Sample I exhibited good adhesion to cellulose acetate.

Sample II did not exhibit any adhesion to cellulose acetate.

EXAMPLE 4

A solution of the following composition is applied to a 100μ thick glass-clear sheet of biaxially oriented polyethylene terephthalate:

17.5 g of a copolyester of terephthalic acid, neopentyl glycol and ethylene glycol, having a mean molecular weight of 18,000 to 20,000, 7.5 g of a copolymer of methylvinyl ether/maleic acid anhydride having a softening point of 200° C. and a value for η sp of 0.1 to 0.5 measured at 25° C., 0.1 percent concentration, in methyl ethyl ketone, 1.8 g of a solution of the addition product of trimethylol propane with toluylene diisocyanate in ethyl acetate, dissolved so that the solution is of 75% by weight concentration, and 473.2 g of tetrahydrofuran.

The solution was dried at an elevated temperature to a film of
0.5 g/m².

This adhesive layer was coated, as described in Example 2, with films of cellulose propionate and compared with samples in which the layer did not contain the additional above-mentioned polymer. The layers of cellulose propionate adhered well only to the substrate of the invention but not where the additional copolymer was omitted.

EXAMPLE 5

The following solution was applied to a substrate having an adhesive layer according to Example 4, and dried at 140° C. to a film of a thickness of 6μ:

70 g of a copolymer of acrylamide and acrylic acid having a molecular weight of approximately 200,000, 0.3 g of alkylaryl-polyglycol ether with 13 ethoxy groups per molecule as cross-linking agent, and 930 g of water.

The hydrophilic polymer adhered well to the substrate according to the invention, but did not adhere to a layer that had been formed from the copolyester with the polyisocyanate alone.

EXAMPLE 6

Solutions, which were prepared as described in Example 4, were used to form substrates. In each case 7.5 g of the following additional polymers were used:

(a) A copolymer of methylvinyl ether and maleic acid anhydride, as described in Example 4, (b) A copolymer of acrylic acid/methacrylic acid esters having a viscosity of 350 to 650 cp measured as a 40% by weight solution in toluene, (c) Hexamethoxymethyl melamine, and (d) No addition.

A solution of the following composition was applied to the samples with adhesive layers according to (a) to (d):

70 g of hydroxypropyl cellulose having a mean molecular weight of approximately 100,000, 930 g of water, and 0.3 g of alkylaryl/polyglycol ether with 13 ethoxy groups per molecule.

The adhesion of the layer of hydroxypropyl cellulose to the substrates according to a to c, which contained the addition of an additional polymeric substance in accordance with the invention was good, but in the case of sample d, which did not contain any additional polymer, was poor.

EXAMPLE 7

The procedure was as in Example 1, but with the following solution:

60 g of an 18% by weight solution of a commercially available copolycondensate of terephthalic acid, isophthalic acid and sebacic acid as acid components, and ethylene glycol, diglycol and butanediol as alcohol components, 2.5 g of a film-forming polyisocyanate, dissolved in ethyl acetate as a cross-linking component, 4.5 g of cellulose propionate with an acetyl content of 3.6%, a propionyl content of 44.8% and a hydroxyl content of 1.8%, and 470 g of tetrahydrofuran.

Layers which adhere well to the support but which do not stick together, and can be wound and unwound well, are obtained. If the cellulose propionate is omitted, then sheets are obtained which cannot be unwound from a roll without damage to the surface.

Layers having a high proportion of the additional polymers in accordance with the invention may, if desired, particularly in the case of large application weights, themselves be used as substrates for certain uses, without any other substrate, inasmuch as by nature they are bonded very well with polyester film.

It will be obvious to those skilled in the art that many modifications may be made within the scope of the present invention without departing from the spirit thereof and the invention includes all such modifications.

What is claimed is:

1. A composition, suitable for use as an adhesive layer on a shaped structure of a polyester, which comprises a blend of a copolyester formed from a polyhydric alcohol and a dicarboxylic acid, and a polyisocyanate, and, in addition, containing an organic polymer compound compatible with the blend of the copolyester and the polyisocyanate, and being selected from the group of cellulose esters, vinylidene chloride copolymers, copolymers of methylvinyl ether and maleic acid anhydride and acrylic/methacrylic acid esters, the ratio by weight of copolyester to the polymer compound being within the range of from about 20:1 to 0.5:1.

2. A composition as claimed in claim 1, wherein the ratio is between 10:1 and 1:1.

3. A composition as claimed in claim 1 wherein the polymer is a cellulose ester.

4. A composition as claimed in claim 3 wherein the polymer is cellulose acetate, propionate, or acetobutyrate, or two or more of such materials.

5. A composition as claimed in claim 1 wherein the polymer is a vinylidene chloride copolymer.

6. A composition as claimed in claim 5 wherein the polymer is a vinylidene chloride/acrylonitrile copolymer.

7. A composition as claimed in claim 1 wherein the copolymer is a copolymer of methylvinyl ether and maleic acid anhydride and acrylic/methacrylic acid esters.

8. A composition as claimed in claim 1 wherein the copolyester is a copolyester of terephthalic, isophthalic and sebacic acids with ethylene glycol, diglycol and butanediol or a copolyester of terephthalic acid, neopentyl glycol and ethylene glycol.

* * * * *